United States Patent
Tanaka et al.

(10) Patent No.: US 8,663,797 B2
(45) Date of Patent: Mar. 4, 2014

(54) HIGH-STRENGTH ADHESIVE POLYMER GEL AND ADHESIVE TAPE

(75) Inventors: Hiroyoshi Tanaka, Nara (JP); Shuichi Sasahara, Nara (JP)

(73) Assignee: Sekisui Plastics Co., Ltd., Osaka (JP)

( * ) Notice: Subject to any disclaimer, the term of this patent is extended or adjusted under 35 U.S.C. 154(b) by 578 days.

(21) Appl. No.: 12/281,012

(22) PCT Filed: Mar. 20, 2007

(86) PCT No.: PCT/JP2007/055720
§ 371 (c)(1),
(2), (4) Date: Aug. 28, 2008

(87) PCT Pub. No.: WO2007/111200
PCT Pub. Date: Oct. 4, 2007

(65) Prior Publication Data
US 2009/0068388 A1    Mar. 12, 2009

(30) Foreign Application Priority Data
Mar. 28, 2006    (JP) .................... 2006-088868

(51) Int. Cl.
*B32B 7/12*    (2006.01)
*C08L 33/26*    (2006.01)

(52) U.S. Cl.
USPC .............. 428/352; 428/343; 428/355 AC; 428/41.5; 428/41.7; 524/556

(58) Field of Classification Search
USPC ........ 428/355 AC, 41.3, 352, 343, 41.5, 41.7; 524/556
See application file for complete search history.

(56) References Cited

U.S. PATENT DOCUMENTS

| | | | | |
|---|---|---|---|---|
| 3,637,615 A | * | 1/1972 | Coffman | 428/355 AC |
| 4,442,258 A | * | 4/1984 | Sunakawa et al. | 524/767 |
| 5,370,924 A | * | 12/1994 | Kochinke | 424/443 |
| 5,429,590 A | * | 7/1995 | Saito et al. | 602/48 |
| 5,505,956 A | * | 4/1996 | Kim et al. | 424/448 |
| 5,783,209 A | * | 7/1998 | Imamura et al. | 424/448 |

FOREIGN PATENT DOCUMENTS

| | | |
|---|---|---|
| JP | 9-078050 | 3/1997 |
| JP | 10-192444 | 7/1998 |
| JP | 11-035632 | 2/1999 |
| JP | 2001-245913 | 9/2001 |
| JP | 2004-359808 | 12/2004 |

OTHER PUBLICATIONS

English Language Abstract of JP 2001-245913, Sep. 11, 2001.
English Language Abstract of JP11-035632, Feb. 9, 1999.
English Language Abstract of JP 10-192444, Jul. 28, 1998.
English Language Abstract of JP 9-078050, Mar. 25, 1997.
English Language Abstract of JP2004-359808, Dec. 24, 2004.

* cited by examiner

*Primary Examiner* — Hai Vo
(74) *Attorney, Agent, or Firm* — Greenblum & Bernstein, P.L.C.

(57) ABSTRACT

A high-strength adhesive polymer gel comprising a polymer and polyhydric alcohol, wherein the polymer comprises a monopolymer of an acrylic monomer having an alkoxyalkyl group, or a copolymer of the acrylic monomer having an alkoxyalkyl group and another acrylic monomer which can be copolymerized with the acrylic monomer having an alkoxyalkyl group, and wherein the acrylic monomer having an alkoxyalkyl group makes up 50% by weight or more of a total amount of a polymerizable monomer.

6 Claims, 1 Drawing Sheet

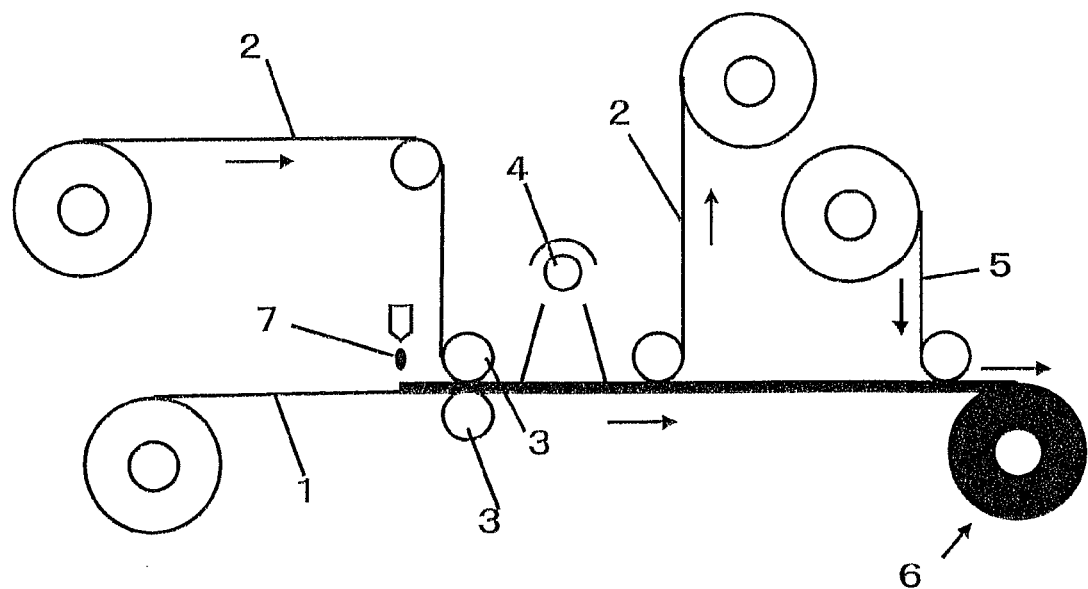
Fig. 1
Fig. 2
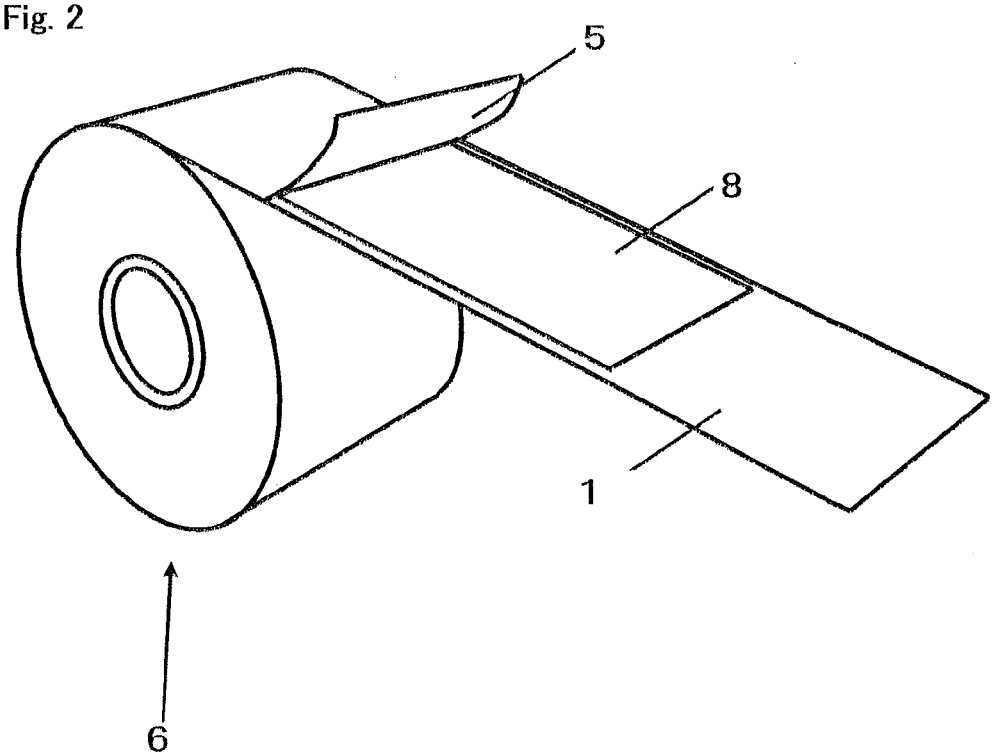

HIGH-STRENGTH ADHESIVE POLYMER GEL AND ADHESIVE TAPE

TECHNICAL FIELD

The present invention relates to a high-strength adhesive polymer gel and an adhesive tape. The high-strength adhesive polymer gel and the adhesive tape of the present invention can be used for a wide range of applications such as biomaterials, medical materials, hygienic materials, and industrial materials.

BACKGROUND ART

In recent years, studies and researches on a polymer gel are advanced and the polymer gel is applied to various areas. The polymer gel is mainly classified into two kinds of gels of hydrogel and organogel.

The hydrogel is being used, for example, in a biomedical area. In this area, the hydrogel is used as raw materials of a biocompatible material typified by a contact lens, a wound dressing and a conductive adhesive material for a biomedical electrode for connecting an electrocardiographic meter or a low-frequency therapy equipment with a living body. In the adhesive material for a living body, a try to adopt adhesive materials composed of the hydrogel of a polymer gel type instead of conventional adhesive materials in order to reduce cutaneous irritation is made.

Furthermore, the hydrogel is also used in an industrial area other than a biomedical area. It is studied to use the hydrogel, for example, as raw materials of a special adhesive tape which is used in a semiconductor process step, a cell material, various sensors to utilize a stimulus-responsive property such as a heat-sensitive property, and an adhesive material for a vibration-proofing material or earthquake strengthening to utilize viscoelasticity.

On the other hand, as the organogel, there are a gel formed by including a plasticizer such as aliphatic esters in a matrix of crosslinked polyacryl ester, which is used for a living body or a special adhesive tape, a solid electrolyte gel containing polyol as a skeleton, which is used for a cell material, a gel containing a solvent like alkylene carbonate, a polyurethane gel, and a styrene-ethylene based gel in which paraffin is used as a plasticizer.

In recent years, it is studied to newly use the polymer gel for optical uses. Specifically, it is studied to use the polymer gel as spacers of a PDP, a liquid crystal display and a touch panel.

For example, the PDP includes a panel and an optical filter and a gap is provided between the optical filter and the panel in order to protect the panel. Conventional PDPs have a problem that this gap causes a ghost image phenomenon due to the reflection of incident light from an outside and this phenomenon degrade image quality.

Therefore, a polymer gel, which can impart a vibration-proofing property and a buffering property to the gel and can also control stickiness, receives attention in order to solve this problem. That is, by only bonding the panel to optical filter with the polymer gel, it is possible to bond and fix the panel to the optical filter, and to protect the panel. In addition, by filling the gap with the polymer gel, it becomes possible to control the degradation of image quality.

However, the aforementioned well-known gel has several problems.

For example, since the hydrogel contains a large amount of water, if it contacts an electronic material directly, it has a risk of making a short circuit. Therefore, practical use of the hydrogel in this application is difficult. Further, the hydrogel is stable in use at normal temperature or in the vicinity of a body temperature. However, when the gel is exposed to elevated temperatures, hydrolysis of a resin constituting a matrix is accelerated, and on the other hand, when the gel is exposed to extremely low temperatures, the gel may freeze. Accordingly, there is a fear of the durability of the hydrogel.

On the other hand, the organogel does not have adequate stickiness.

The stickiness can be enhanced by set a crosslinking density of a resin in the organogel at a low level to soften the gel itself. Further, it is necessary to lower the crosslinking density as the organogel becomes thin. Then, the processability of the organogel is deteriorated and the precision of a thickness is deteriorated. It is proposed to reinforce the organogel by use of a member such as a supporter or an intermediate base material in order to supplement the deterioration of the precision. However, when these reinforcing materials are used, transparency of the gel tends to deteriorate. Therefore, usable reinforcing materials are limited to reinforcing materials formed from special materials.

In Japanese Unexamined Patent Publication No. 2004-359808 (Patent Document 1), a transparent adhesive material in gel form for placing between the panel and the optical filter, having a buffering property, is proposed. According to this Publication, as an adhesive material to bond the panel to the optical filter, there is proposed a clear gel adhesive material, wherein (1) a clear gel of the clear gel adhesive material is formed by swelling a solution in which a three-dimensionally crosslinked polymer contains a plasticizer and inorganic particles, (2) the clear gel contains a liquid plasticizer having a freezing point of −20° C. or lower in an amount 20 to 70% by weight, (3) the clear gel contains inorganic particles having a primary average particle diameter of 200 nm or less in an amount 1 to 15% by weight, (4) a resin (resin before crosslinking) composing the three-dimensionally crosslinked polymer is a resin having a glass transition temperature (Tg) of −20° C. or lower and melt viscosity of 50000 mPa·s or more at 130° C., and (5) a retention power is 5 mm or less under the conditions of 40° C. and load of 490 mN (50 gf) for 2 hours in a test according to JIS Z 0237. Patent Document 1: Japanese Unexamined Patent Publication No. 2004-359808

DISCLOSURE OF THE INVENTION

Problems to be Solved by the Invention

For example, it is desired that the gel can be re-stuck to correct involved extraneous substances or misalignment of a sticking position when sticking the gel. However, the gel described in the above patent publication does not have large tensile strength. Therefore, since this gel breaks or is deformed in peeling off the gel for re-sticking, the gel has low handling ability.

On the other hand, in order to enable to re-stick a gel by increasing the tensile strength of the gel, it is necessary to increase a crosslinking agent, but an adhesive force of the gel is reduced by this method.

That is, the tensile strength and the adhesive force conflict with each other, and therefore a gel having an adequate adhesive force and tensile strength in a balanced manner is not known.

Means for Solving the Problems

The present inventors surprisingly found that a gel having an adequate adhesive force and tensile strength in a balanced manner can be obtained by using a polymer derived from an acrylic monomer having an alkoxyalkyl group for a polymer composing the gel, and these findings have now led to completion of the present invention.

Thus, the present invention provides a high-strength adhesive polymer gel comprising a polymer and polyhydric alcohol, wherein the polymer comprises a monopolymer of an acrylic monomer having an alkoxyalkyl group, or a copolymer of the acrylic monomer having an alkoxyalkyl group and another acrylic monomer which can be copolymerized with the acrylic monomer having an alkoxyalkyl group, and wherein the acrylic monomer having an alkoxyalkyl group makes up 50% by weight or more of a total amount of a polymerizable monomer.

Further, the present invention provides a high-strength adhesive polymer gel comprising of a polymer and polyhydric alcohol, wherein the gel has a vertical adhesive force of 300 g/Φ12 or more and tensile strength of 2N or more.

Furthermore, the present invention provides an adhesive tape comprising a supporter, a layer of the aforementioned high-strength adhesive polymer gel which is coated on at least one surface of the supporter, and a separator film covering the layer of the high-strength adhesive polymer gel.

Effect of the Invention

The high-strength adhesive polymer gel of the present invention has an adequate adhesive force and tensile strength in a balanced manner. Accordingly, in the case where there is a necessity to re-stick the gel due to involved extraneous substances or misalignment of a sticking position in sticking the gel, the gel of the present invention can be readily re-stuck without breaking nor being deformed even though reinforcing materials are not used.

BRIEF DESCRIPTION OF THE DRAWINGS

FIG. 1 is a schematic explanatory view of a production method of a roll of an adhesive tape of Example, and FIG. 2 is a schematic view of a roll of an adhesive tape of Example.

DESCRIPTION OF THE REFERENCE NUMERALS AND SYMBOLS

| | |
|---|---|
| 1, 2 | PET film |
| 3 | roll |
| 4 | metal halide lamp |
| 5 | polyethylene film |
| 6 | roll of an adhesive tape |
| 7 | monomer-compounded solution |
| 8 | gel |

BEST MODE FOR CARRYING OUT THE INVENTION

A high-strength adhesive polymer gel of the present invention (hereinafter, also referred to as just a gel) is composed of a polymer and a polyhydric alcohol. It is thought that the polymer has a matrix form in the gel. Further, the polymer contains a polymerizing component derived from an acrylic monomer having an alkoxyalkyl group. Furthermore, when the polymer comprises a copolymer, the acrylic monomer having an alkoxyalkyl group, which is a raw material of the copolymer, makes up 50% by weight or more (preferably, 70% by weight or more) of a total amount of a polymerizable monomer.

(Polymerizable Monomer)

In the present invention, as the polymerizable monomer, the acrylic monomer having an alkoxyalkyl group is mainly used.

Number of total carbon atoms in the alkoxyalkyl group is preferably 2 to 10 from the viewpoint of easy solubility of the monomer in a polyhydric alcohol, more preferably 4 to 10, and furthermore preferably 5 to 8. When number of total carbon atoms in an alkoxy group and an alkyl group falls within the above-mentioned range, it is easy to prepare a uniform composition of the monomer and the polyhydric alcohol. Further, when the number of total carbon atoms falls within the above-mentioned range, there is an effect of making the polymerized gel transparent.

Furthermore, an alkoxy group in the alkoxyalkyl group preferably has 1 to 9 carbon atoms, and more preferably has 2 to 7 carbon atoms.

Examples of the acrylic monomer having an alkoxyalkyl group include methoxyethyl (meth)acrylate, ethoxyethyl (meth)acrylate, propoxyethyl (meth)acrylate, and alkoxyalkyl acrylamide such as n-ethoxymethyl (meth)acrylamide, n-propoxymethyl (meth)acrylamide, n-butoxymethyl (meth)acrylamide, isobutoxymethyl (meth)acrylamide, n-pentoxymethyl (meth)acrylamide, n-hexylmethyl (meth)acrylamide, n-heptoxy (meth)acrylamide, n-octoxymethyl (meth)acrylamide, n-ethoxyethyl (meth)acrylamide, n-propoxyethyl (meth)acrylamide, and n-butoxyethyl (meth)acrylamide. These monomers can be used singly or in combination of two or more species. In addition, (meth)acrylate means methacrylate or acrylate, and (meth)acryl means acryl or methacryl.

The acrylic monomer having an alkoxyalkyl group makes up 50% by weight or more of a total amount of a polymerizable monomer. Thereby, a gel having an adequate adhesive force and tensile strength can be obtained.

Here, in the present specification, the gel refers to a polymer having a three-dimensional network structure or a swelled substance thereof. The present inventors believe that the structure of the gel does not always have to be a structure associated with a chemical reaction and it may be a structure based on secondary bonding strength, for example, a hydrogen bond.

The polymer to be used for the present invention can form a gel which retains the polyhydric alcohol stably even though the polymer is not formed by copolymerizing a crosslinkable monomer. The present inventors believe that the reason for this is that the alkoxyalkyl group composing the polymer to be used for the present invention and the polyhydric alcohol form a polar bond to have a pseudo crosslinking structure.

However, in order to further increase the tensile strength, the polymer formed by copolymerizing the acrylic monomer having an alkoxyalkyl group with the acrylic crosslinkable monomer may be used for the polymer to be used in the present invention. The crosslinkable monomer is preferably an acrylic monomer having two or more polymerizable carbon-carbon double bonds in a molecule. Examples of this acrylic monomer include polyfunctional acrylate derivatives such as N,N'-methylenebis(meth)acrylamide, N,N'-ethylenebis(meth)acrylamide, (poly)ethyleneglycol di(meth)acrylate, (poly)propyleneglycol di(meth)acrylate, and the like. An amount of the crosslinkable monomer to be used is preferably 3 parts by weight or less with respect to 100 parts by weight of the acrylic monomer having an alkoxyalkyl group.

When the gel is used as an adhesive for a biologic body or an industrial adhesive, an adhesive force suitable for application is required. Preparation of the adhesive force may be performed by copolymerizing another acrylic monomer other than the acrylic monomer having an alkoxyalkyl group with the acrylic monomer having an alkoxyalkyl group. As another acrylic monomer, a monomer, which is uniformly dissolved in the polyhydric alcohol, is preferably used. Further, a monomer, which becomes a clear gel after being polymerized, is preferably used.

Examples of the another acrylic monomers include hydrophobic monomers, ionic monomers, and monomers (amphiphilic monomers) having a hydrophilic property and a lipophilic property.

Examples of the hydrophobic monomers include alkyl (meth)acrylates such as isobutyl (meth)acrylate, n-butyl (meth)acrylate, cyclohexyl (meth)acrylate, isooctyl (meth)acrylate and the like.

Examples of the ionic monomers include unsaturated carboxylic acids such as acrylic acid, methacrylic acid, itaconic acid, maleic acid, allylcarboxylic acid and the like; sulfonic acids such as sulfoethyl (meth)acrylate, sulfopropyl (meth)acrylate, sulfobuthyl (meth)acrylate, styrenesulfonic acid, vinylsulfonic acid and the like; aminoalkyl (meth)acrylate such as N,N-dimethylaminoethyl (meth)acrylate, N,N-dimethylaminopropyl (meth)acrylate and the like; and salts thereof.

Examples of the amphiphilic monomers include N,N-dimethyl(meth)acrylamide, N,N-diethyl(meth)acrylamide, N-isopropyl(meth)acrylamide, hydroxyethyl(meth)acrylamide, and (meth)acryloylmorpholine.

A content of the above-mentioned another acrylic monomers is preferably at most 100 parts by weight with respect to 100 parts by weight of the acrylic monomer having an alkoxyalkyl group, and more preferably at most 60 parts by weight. If the another acrylic monomers polymerization is copolymerized within this range, a gel, in which stickiness is controlled while having high tensile strength, is obtained.

(Polyhydric Alcohol)

The polymer composing the gel is hydrophobic but has a polarity since it has an alkoxyalkyl group on the side chains. Further, the polyhydric alcohol simultaneously has a hydroxyl group of a polar group and a hydrophobic alkyl group. Therefore, the present inventors think that since a polar bond is produced between the polymer and the polyhydric alcohol, the polyhydric alcohol does not bleed to the surface and is retained stably. The present inventors think that on the contrary, when the gel is brought into contact with a large amount of water, the polyhydric alcohol can be prevented from flowing away out of the gel by virtue of the interaction between a hydrophobic portion of the polyhydric alcohol and a hydrophobic portion of the alkoxyalkyl group. Common plasticizers having low polarity such as aliphatic esters, which are not a polyhydric alcohol, may fail to be retained in the polymer stably and may bleed to the surface of the gel.

The polyhydric alcohol is not particularly limited, and as the polyhydric alcohol, well-known polyhydric alcohols may be used singly or in combination of two or more species.

However, it is difficult to use highly hydrophilic polyhydric alcohols such as ethylene glycol and glycerin singly. Therefore, when the highly hydrophilic polyhydric alcohol has to be used, it is preferable to use a mixture of the highly hydrophilic polyhydric alcohol and a polyhydric alcohol having high compatibility with the acrylic monomer having an alkoxyalkyl group to be used for forming a polymer.

Preferable polyhydric alcohol is polyhydric alcohols having a relatively high lipophilic property such as propylene glycol, butanediol, pentanediol, hexanediol, or polyoxyalkylene group-containing polyhydric alcohols, for example, polypropylene glycol and polybutanediol. The high lipophilic property means that 15 g or more of benzene is dissolved in 100 g of a polyhydric alcohol at 25° C. For example, in 100 g of propylene glycol, 19.2 g benzene is dissolved.

Further, as the polypropylene glycol, PPG 1000 and PPG 2000 produced by Wako Pure Chemical Industries, Ltd. can be used. It was confirmed that these commercially available glycols are dissolved in benzene in any given ratio.

A furthermore preferable polyhydric alcohol is a polyether addition products of (poly)glycerin. The polyether addition products of (poly)glycerin have a branched structure since a hydroxyl group of (poly)glycerin is modified with polyol. Accordingly, since the polyether addition products of (poly)glycerin have high degree of steric hindrance and low crystallinity, the polyether addition products of (poly)glycerin are liquid at normal temperature even though they have a high molecular weight in contrast to normal linear substances, and therefore they can be used as a solvent component or a plasticizer of a polymer gel.

Specific examples of the polyether addition products of (poly)glycerin include polyoxyethylene glyceryl ether, polyoxyethylene diglyceryl ether, polyoxyethylene polyoxypropylene glyceryl ether, polyoxyethylene polyoxypropylene diglyceryl ether, polyoxypropylene glyceryl ether, polyoxypropylene diglyceryl ether, and the like.

As the polyether addition products of (poly)glycerin, SCP-400, 1000, 1200, 1600 produced by Sakamoto Yakuhin Kogyo Co., Ltd. can be used. It was confirmed that these commercially available glycerin products are dissolved in benzene in any given ratio.

A content of the polyhydric alcohol is preferably 40 to 200 parts by weight with respect to 100 parts by weight of the polymerizable monomer. When the content of the polyhydric alcohol is in this range, a polymer gel having high tensile strength is obtained. A more preferable range of the content is 50 to 150 parts by weight, a furthermore preferable range is 60 to 150 parts by weight, and a particularly preferable range is 65 to 130 parts by weight.

(Another Component)

The electrolyte may be added to the gel. It is possible to impart the conductivity based on ionic conduction to the gel by this addition. Examples of applications, in which it is desired to impart the conductivity to the gel, include the following applications. For example when the gel is used as an antistatic material or a material for evaluating antistatic performance, specific resistance of the gel is preferably adjusted so as to fall within a range of $10^7$ to $10^5$ Ω·cm. Particularly when the gel is used for the diselectrification of precise electronic devices, if resistance of the gel is too low, this may result in rapid discharge to cause a breakdown of a circuit in the electronic device. The aforementioned range is a range where such a breakdown can be prevented.

Further, in the application aimed at prevention of static charge, for example, in the case where the gel is used for a tape used for carrying semiconductors, the specific resistance of the gel is preferably adjusted so as to be $10^7$ Ω·cm or less.

Furthermore, if the specific resistance of the gel is adjusted so as to be 5 kΩ·cm or less, the gel can be suitably used as conductive materials for a lithium ionic cell, a solar cell, an electrochromic material, and another display devices (for example, a PDP, a liquid crystal panel).

Examples of the electrolyte include common electrolytes such as halides, sulfates, carbonates and nitrates, and in addition salts of perchloric acid, hexafluorophosphoric acid or tetrafluoroboric acid as a polymer solid electrolyte, and organic acids and salts thereof. Furthermore, examples of the salts include salts derived from groups of salts of alkaline metals such as lithium, sodium, potassium and the like, alkaline earth metals such as calcium, magnesium and the like, organic salts such as amine or ammonium and alkanol amine or alkanolammonium. Further, an ionic liquid may be employed in place of the electrolyte. Examples of the ionic liquid include combinations of imidazolium salt based aromatic compounds or aliphatic quaternary ammonium salt and inorganic ions such as $BF_4^-$ and the like, or fluorine-containing organic ions.

The electrolyte is preferably contained in an amount 0.5% by weight or more with respect to a total amount of the gel in order to impart adequate conductivity to the gel. An upper limit of an amount of the electrolyte to be added is not particularly limited as long as the amount of the electrolyte to be added is within a range where the electrolyte is dissolved in a polyhydric alcohol or a solvent in the gel. However, even if the electrolyte is added in an amount more than 15% by weight with respect to a total amount of the gel, the conductivity has reached a saturated condition, therefore improvement in the conductivity cannot be generally desired. Accordingly, it is preferable that the amount of the electrolyte to be added is 15% by weight or less.

Further, an organic solvent capable of reducing the impedance of the gel may be added to the gel. Examples of such the organic solvent include acetonitrile, dimethyl carbonate, ethylene carbonate, propylene carbonate, and butylene carbonate. Two or more of these organic solvents may be mixed.

The gel may contain water within a range of 20 parts by weight or less with respect to 100 parts by weight of the polyhydric alcohol. By containing water, the added electrolyte becomes easy-to-ionize and the conductivity of the gel can be improved. By containing water, a small amount of water-soluble medicinal properties can be added. Further, when a fragrant material is added, an effect of promoting the fugacity of an aromatic ingredient in the fragrant material is also achieved by containing water.

To the gel of the present invention, an antiseptic agent, a disinfectant, a fungicide, a rust preventive agent, an antioxidant, a stabilizer, a pH adjuster, a fragrant material, a surfactant, a coloring agent, an anti-inflammatory medication, a vitamin preparation, a whitening agent and other medicinal properties may be added as required.

(Configuration of Gel)

The gel of the present invention can be appropriately molded in accordance with applications since liquid monomer-compounded solution is polymerized to be gelated. For example when the gel is applied to an adhesive tape, it is desired that the gel is formed into a shape of sheet with a thickness of 0.01 to 2.0 mm.

Here, in accordance with the present invention, it is possible to provide a gel exhibiting an elastic modulus of 2000 to 50000 Pa at 1 rad/s and 2000 to 50000 Pa at 0.01 rad/s and a viscosity coefficient of 300 to 20000 Pa at 1 rad/s and 10 to 2000 Pa at 0.01 rad/s when the gel has a thickness of 0.5 mm. By having the elastic modulus and the viscosity coefficient within these ranges, it is possible to provide a gel which readily conforms to a shape of an adherend and remains a little in peeling off the gel. Further, it is preferable that the viscosity coefficient is smaller than the elastic modulus in a frequency range of 1 to 0.01 rad/s. In addition, an elastic modulus of 3500 to 20000 Pa at 1 rad/s and 3500 to 20000 Pa at 0.01 rad/s and a viscosity coefficient of 500 to 5000 Pa at 1 rad/s and 30 to 1000 Pa at 0.01 rad/s are more preferable.

Furthermore, the gel preferably has a vertical adhesive force of 300 g/φ2 or more and tensile strength of 2N or more. The gel more preferably has a vertical adhesive force of 500 to 2000 g/φ12 and tensile strength of 2.5 to 15 N.

Here, when the gel has the above-mentioned specific vertical adhesive force and tensile strength, it has the following advantages.

That is, for example when dusts are involved in sticking the polymer gel, it is desired to peel off the polymer gel stuck once cleanly without breaking the gel. In this case, a highly elastic gel, a polymer of which does not fracture by a tensile force, is desired. This can be estimated to some extent by measuring a load at a time when the gel is actually pulled to break, namely tensile strength. It is conceivable that when this load is high, the gel hardly breaks in peeling off the gel while pulling it.

Further, in consideration of a process of peeling off the gel actually, it is desired that the gel is not elongated too much in stretching it. In the present invention, in order to impart stickiness to the gel, a polyhydric alcohol is added to the gel to make the gel flexible. Therefore, when the gel is pulled, it exhibits elongation according to its vertical adhesive force. However, when the stretch of the gel is large, it may become difficult to peel off the gel and the gel may not return to an original form after peeling off it.

Considering that the gel does not break in peeling off it and returns to an original form after peeling off it as described above, it is preferable to have the above-mentioned values of vertical adhesive force and tensile strength.

It is preferable to provide a separator for protecting a surface on both faces of the gel. One of the separators may be the supporter. The other separator preferably remains attached through the end product as a base film. The separator in this case can be peeled off immediately before the end user uses the gel. In addition, the supporter refers to a film, a nonwoven fabric, or a woven fabric for reinforcing the gel and maintaining the configuration of a tape. Generally, the gel is coated on the supporter and used as the so-called adhesive tape.

A material of the separator is not particularly limited as long as it is a resin or paper which can be formed into a shape of film. Among others, a resin film, paper, or paper formed by laminating the resin films, which are made from polyester, polyolefin, polystyrene, or the like, is suitably used. Particularly when the separator is used as a base film, a biaxially oriented PET film and paper formed by laminating OPP or polyolefin are preferable.

A surface of the separator to contact with the gel is preferably subjected to a mold release treatment. Further, both faces of the separator may be subjected to the mold release treatment as required. When both faces of the separator are subjected to the mold release treatment, there may be difference between peel strength of both faces. Examples of the method of the mold release treatment include silicone coating. Particularly, silicone coating of a baking type, in which coating material is crosslinked and cured by heat or ultraviolet light, is preferable.

As for a top film, located on the side opposite to the base film, of separators, an optimal material is selected according to a product pattern of the gel. For example when the gel is treated in the form of strap, the top film is not particularly limited as long as it is a resin or paper which can be formed into a shape of film as with the case described above, but the top film is preferably subjected to a mold release treatment as with the base film.

When the gel is wound in a shape of roll to be stored or distributed, the top film is desirably flexible. The film having flexibility may be used on the inner peripheral side and/or the outer peripheral side of the rolled sheet, but it is more preferable that it is arranged on the outer peripheral side of the rolled sheet. Specifically, when a gel sheet having a three-layer structure of base film, gel and top film is wound around a roll, if the top film placed on at least one side (located on the outer peripheral side) of the sheet is stretched, roll wrinkles by rolling can be decreased. Use of a film not having flexibility on both sides of the sheet is not preferable since this increases a risk of producing the wrinkle by rolling.

Further, as the supporter, a resin film, which is subjected to or not subjected to a mold release treatment, can be used. Examples of the resin films include polyester, polyolefin, polystyrene, polyurethane and the like.

An adhesive tape including the above-mentioned supporter can be produced, for example, by a method in which the gel is formed and then the supporter is attached to the gel or a method in which the monomer-compounded solution is coated directly on the supporter and ultraviolet light is irradiated to the coated solution to form a gel. Further, by sticking gels having different adhesive forces on a front face and a back face of the supporter, respectively, an adhesive tape, in which there is a difference in the adhesive force between the front and the back faces, can be prepared.

For example when the adhesive tapes are distributed as intermediate materials for processing, it is desired that handling of the tape in end plastic processors is easy. The adhesive tape may have a nonwoven fabric or a woven fabric buried in the gel as an intermediate base material as required. When the gel is formed into a shape of sheet, these intermediate base materials play a role in reinforcing the gel and improving the maintainability of a gel configuration in cutting a tape. As a material of the nonwoven fabric and the woven fabric, natural fibers such as cellulose, silk, hemp or the like, synthetic fibers such as polyester, nylon, rayon, polyethylene, polypropylene, polyurethane or the like, or blended fabric thereof can be employed. The nonwoven fabric and the woven fabric may be bound with a binder, may be colored, or may be subjected to a conductive treatment as required.

Further, a film may be employed in place of the nonwoven fabric and the woven fabric. Examples of the usable films include resin films such as polyester, polyolefin, polystyrene, polyurethane and the like. These films may be holed, may have a multilayer structure, or may be colored.

(Production Method of Gel)

The gel is obtained, for example, by (1) preparing a monomer-compounded solution containing an acrylic monomer having an alkoxyalkyl group, another acrylic monomer as an optional component, and a polyhydric alcohol, and (2) polymerizing this solution and simultaneously forming the resulting gel into an arbitrary shape.

(1) Preparation of Monomer-Compounded Solution

Another acrylic monomer, optionally, and an initiator were mixed in an acrylic monomer having an alkoxyalkyl group, and the resulting mixture was stirred to be dissolved. Next, an electrolyte and an additive are added as required and stirred until the electrolyte and the additive are dissolved. Then, a polyhydric alcohol is added to the resulting solution to prepare a transparent and colorless monomer-compounded solution. In addition, when the additive is originally colored or a dye or a pigment is added, the obtained monomer-compounded solution has not to be transparent and colorless.

(2) Polymerization Reaction and Forming

A gel is obtained by filling the obtained monomer-compounded solution into a mold in any shape and then polymerizing the monomer-compounded solution. Further, a sheet-like gel is obtained by pouring the monomer-compounded solution into a space between two resin films (a base film and a top film) and polymerizing the solution with a thickness of the solution kept constant. Furthermore, a film-like (thinner than a sheet-like) gel is obtained by coating a thin layer of the monomer-compounded solution on a resin film (a base film or a support) and polymerizing the solution.

Examples of methods of polymerization include redox polymerization, photopolymerization, and radiation polymerization in addition to common radical polymerization. For example when the monomer-compounded solution is filled into a mold having a thickness or a depth of 10 mm or more and polymerized, redox polymerization or common radical polymerization is suitable. On the contrary, when the gel is formed into a shape of sheet or film having a thickness of several millimeters to several micrometers, photopolymerization is suitable. In accordance with the polymerization by light irradiation, a reaction rate is fast, but when a thickness of a material is large, there is a possibility that light is attenuated during passing through the material and variations in light irradiation result in a direction of thickness. As for the polymerization by radiation, a penetrating power of radiation is superior to that of light, but facilities for radiation becomes extensive, and therefore this technique is suitable for a large-scale production.

In addition, when two resin films are arranged on both sides of a gel and a gel is produced by light irradiation, as a material of the top film placed on the side to which light is irradiated, it is necessary to select a material which does not shield light. Further, the aforementioned films, which have been exemplified as a supporter, are discouraged from being used as a top film. Particularly when there is a possibility that the aforementioned supporter is deteriorated by ultraviolet irradiation, it is not preferable since the film will be directly placed on the side to which ultraviolet light is irradiated.

The photopolymerization initiator is not particularly limited as long as it is cloven by ultraviolet light or visible light to produce radicals. Examples of the pholopolymerization initiator include a-hydroxyketone, a-aminoketone, benzylmethyl ketal, bisacylphosphineoxide, metallocene and the like.

Specific examples of the phoLopolymerization initiator include 2-hydroxy-2-methyl-1-phenyl-propane-1-one (trade name: Darocure1173, produced by Ciba Specialty Chemicals K.K.), 1-hydroxy-cyclohexyl-phenyl-ketone (trade name: Irgacure184, produced by Ciba Specialty Chemicals K.K.), 1-[4-(2-hydroxyethoxy)-phenyl]-2-hydroxy-2-methyl-propane-1-one (trade name: Irgacure 2959, produced by Ciba Specialty Chemicals K.K.), 2-methyl-1-[(methylthio)phenyl]-2-morpholinopropane-1-one (trade name: Irgacure 907, produced by Ciba Specialty Chemicals K.K.), and 2-benzyl-2-dimethylamino-1-(4-morpholinophenyl)-butane-1-one (trade name: Irgacure 369, produced by Ciba Specialty Chemicals K.K.). These initiators can be used singly or in combination of two or more species.

The concentration of the photopolymerization initiator is preferably 0.01% by weight or more with respect to the monomer-compounded solution in order to perform a polymerization reaction well and reduce an amount of a residual monomer, and it is preferably 1% by weight or less in order to prevent discoloration (yellowing) or odor due to the initiator remaining after a reaction.

The gel and the adhesive tape of the present invention can be used for a wide range of applications such as biomaterials, medical materials, hygienic materials, and industrial materials. Examples of the biomaterials, the medical materials and the hygienic materials include surgical tapes, fixing tapes for a catheter, a tube for intravenous drip and a sensor like an electrocardiographic electrode, fixing tapes for a fomentation, a wound dressing, a fixing tape for an artificial anus, adhesive materials for fixing a probe for an electric therapy apparatus and a magnetic therapy apparatus, and a carrier-cum-adhesive material of a percutaneous absorbing agent. Examples of the industrial materials include adhesive materials and conductive materials in the areas of the construction materials and electronic materials, spacers of displays (a PDP, a liquid crystal panel, etc.) and touch panels, fillers, vibration-proofing materials, shock absorbers and buffer materials, and a gelating agent for a cell.

EXAMPLES

Hereinafter, the present invention will be described by way of Examples and Comparative Examples, but the present invention is not limited to these. In addition, evaluation methods of properties in Examples and Comparative will be described below.

(Appearance of Gel)

A polymerized gel was visually observed. A polymerized transparent gel was rated as ○ and a polymerized whitish gel or a gel having bleeding of polyhydric alcohol or a plasticizer was rated as x.

(Tensile Strength Test)

Tensile strength was measured according to JIS K 6251, tensile test of vulcanized rubber. First, the gel is punched out with a dumbbell No. 1 according to JIS K 6251 (1993), and then the resulting sample is pulled under the conditions of 23° C., relative humidity 54% and tensile speed 500 mm/min by a TENSILON universal tester (manufactured by ORIENTEC Co., Ltd. in Japan), and a load at a time when the gel breaks is considered as tensile strength.

(Vertical Adhesive Force)

A vertical adhesive force is measured by a vertical tensile testing method. Specifically, a tension tester (manufactured by SUN SCIENTIFIC Co., Ltd. in Japan) (measuring jig tip 12 mm in diameter, material SUS 304) is used for measurement. A gel cut into a size of 40 mm square is fixed to a base of the tester with a double-faced tape produced by Nichiban Co., Ltd. A measuring jig was lowered and pressed against the gel at a rate of 1 mm/min until a load of 30 g was applied to the gel. After reaching the above-mentioned load, the jig is moved up at a speed of 300 mm/min. Ultimate stress at a time when the measuring jig and the gel are peeled off is measured and this stress is considered as a vertical adhesive force.

(Elastic Modulus and Viscosity Coefficient)

The elastic modulus and the viscosity coefficient are measured with Dynalyser DAR-100 manufactured by Reologica Instruments AB (Sweden). A gel punched out from a sheet in a shape of circle of 20 mm in diameter is used as a sample. Measurement is performed under the conditions of 37° C., gap 0.4 mm, strain 5% and frequency 1 to 0.01 rad/s.

(Electric Resistance)

The electric resistance of the gel is measured under the conditions of 23±5° C., relative humidity 55±15%, and 1 kHz with a LCR meter (trade name: ELC-131D, manufactured by CUSTOM in Japan). A gel cut into a size of 20 mm square (thickness 0.5 mm) is sandwiched between stainless steel plates to form a sample.

Example 1

First, in 100 parts by weight of isobutoxymethyl acrylamide (IBMA) as a acrylic monomer having an alkoxyalkyl group, 0.2 parts by weight of 1-[4-(2-hydroxyethoxy)-phenyl]-2-hydroxy-2-methyl-propane-1-one (trade name: Irgacure 2959, produced by Ciba Specialty Chemicals K.K. in Japan) as an initiator was mixed, and the resulting mixture was stirred to be completely dissolved. In the obtained solution, 66.5 parts by weight of polyoxypropylene diglyceryl ether (polyoxypropylene molecular weight 1000, trade name: SCP-1000, produced by Sakamoto Yakuhin Kogyo Co., Ltd.) was mixed as a polyhydric alcohol, and the resulting mixture was stirred to obtain a transparent and colorless monomer-compounded solution.

Next, the monomer-compounded solution was added dropwise onto a PET film coated with silicone. A similar PET film coated with silicone was overlaid on the solution from above and fixed in such a way that the solution was uniformly pressed and spread by the PET to be 0.5 mm in thickness. By irradiating ultraviolet rays having an energy amount of 3000 mJ/cm$^2$ to this with a metal halide lamp, a sheet-like clear polymer gel having a thickness of 0.5 mm was obtained.

The appearance, the tensile strength and the vertical adhesive force of the obtained gel were measured, and the results of measurement are shown in Table 1. Further, the obtained gel had an elastic modulus of 9700 Pa at 1 rad/s and 9200 Pa at 0.01 rad/s and a viscosity coefficient of 3000 Pa at 1 rad/s and 460 Pa at 0.01 rad/s. Further, electric resistance of this gel was measured to obtain an electric resistance value of 550 kΩ.

Example 2

As a acrylic monomer having an alkoxyalkyl group, a mixed solution of 83% by weight of isobutoxymethyl acrylamide and 17% by weight of N,N-diethylacrylamide (DEAA) was used. A clear polymer gel was obtained by following the same procedure as in Example 1 except for mixing 0.2 parts by weight of 1-[4-(2-hydroxyethoxy)-phenyl]-2-hydroxy-2-methyl-1-propane-1-one as an initiator in 100 parts by weight of the aforementioned mixed solution, and stirring the resulting mixture to completely dissolve.

The appearance, the tensile strength and the vertical adhesive force of the obtained gel were measured, and the results of measurement are shown in Table 1.

Example 3

As an acrylic monomer having an alkoxyalkyl group, a mixed solution of 58% by weight of isobutoxymethyl acrylamide and 42% by weight of N,N-diethylacrylamide was used. A clear polymer gel was obtained by following the same procedure as in Example 1 except for mixing 0.2 parts by weight of 1-[4-(2-hydroxyethoxy)-phenyl]-2-hydroxy-2-methyl-propane-1-one as an initiator in 100 parts by weight of the aforementioned mixed solution, and stirring the resulting mixture to completely dissolve.

The appearance, the tensile strength and the vertical adhesive force of the obtained gel were measured, and the results of measurement are shown in Table 1. Further, the obtained gel had an elastic modulus of 7500 Pa at 1 rad/s and 6100 Pa at 0.01 rad/s and a viscosity coefficient of 3200 Pa at 1 rad/s and 500 Pa at 0.01 rad/s.

Example 4

A clear polymer gel was obtained by following the same procedure as in Example 1 except for using polypropylene glycol (PPG 1000, molecular weight 1000, produced by Wako Pure Chemical Industries, Ltd.) as a polyhydric alcohol.

The appearance, the tensile strength and the vertical adhesive force of the obtained gel were measured, and the results of measurement are shown in Table 1. Further, the obtained gel had an elastic modulus of 6000 Pa at 1 rad/s and 5700 Pa at 0.01 rad/s and a viscosity coefficient of 840 Pa at 1 rad/s and 60 Pa at 0.01 rad/s.

Example 5

In 100 parts by weight of isobutoxymethyl acrylamide as an acrylic monomer having an alkoxyalkyl group, 0.3 parts by weight of 1-[4-(2-hydroxyethoxy)-phenyl]-2-hydroxy-2-methyl-propane-1-one as an initiator was mixed, and the resulting mixture was stirred to be completely dissolved to obtain a solution. A clear polymer gel was obtained by following the same procedure as in Example 1 except for mixing 87.5 parts by weight of polyoxypropylene diglyceryl ether (polyoxypropylene molecular weight 1000, trade name: SCP-1000, produced by Sakamoto Yakuhin Kogyo Co., Ltd. in Japan) and 62.5 parts by weight of polypropylene glycol (PPG 2000, molecular weight: 2000, produced by NACALAI TESQUE, Inc.) as a polyhydric alcohol in the obtained solution, and further stirring the resulting mixture to obtain a transparent and colorless monomer-compounded solution.

The appearance, the tensile strength and the vertical adhesive force of the obtained gel were measured, and the results of measurement are shown in Table 1. Further, the obtained gel had an elastic modulus of 4300 Pa at 1 rad/s and 3900 Pa at 0.01 rad/s and a viscosity coefficient of 680 Pa at 1 rad/s and 50 Pa at 0.01 rad/s.

Example 6

In 100 parts by weight of isobutoxymethyl acrylamide as an acrylic monomer having an alkoxyalkyl group, 0.2 parts by weight of 1-[4-(2-hydroxyethoxy)-phenyl]-2-hydroxy-2-methyl-propane-1-one as an initiator and 0.15 parts by weight of polyethyleneglycol dimethacrylate (trade name: BLEMMER PDE-400, produced by NOF Corp. in Japan) as a crosslinkable monomer were mixed, and the resulting mixture was stirred to be completely dissolved to obtain a solution. A clear polymer gel was obtained by following the same procedure as in Example 1 except for mixing 66.0 parts by weight of polyoxypropylene diglyceryl ether (polyoxypropylene molecular weight 1000, trade name: SCP-1000, produced by Sakamoto Yakuhin Kogyo Co., Ltd.) as a polyhydric alcohol in the obtained solution, and further stirring the resulting mixture to obtain a transparent and colorless monomer-compounded solution.

The appearance, the tensile strength and the vertical adhesive force of the obtained gel were measured, and the results of measurement are shown in Table 1.

Example 7

In 100 parts by weight of isobutoxymethyl acrylamide as an acrylic monomer having an alkoxyalkyl group, 0.2 parts by weight of 1-[4-(2-hydroxyethoxy)-phenyl]-2-hydroxy-2-methyl-propane-1-one as an initiator and 0.5 parts by weight of polyethyleneglycol dimethacrylate (trade name: BLEMMER PDE-400, produced by NOF Corp.) as a crosslinkable monomer were mixed, and the resulting mixture was stirred to be completely dissolved to obtain a solution. A clear polymer gel was obtained by following the same procedure as in Example 1 except for mixing 66.0 parts by weight of polyoxypropylene diglyceryl ether (polyoxypropylene molecular weight 1000, trade name: SCP-1000, produced by Sakamoto Yakuhin Kogyo Co., Ltd.) as a polyhydric alcohol in the obtained solution, and further stirring the resulting mixture to obtain a transparent and colorless monomer-compounded solution.

The appearance, the tensile strength and the vertical adhesive force of the obtained gel were measured, and the results of measurement are shown in Table 1. Further, the obtained gel had an elastic modulus of 16400 Pa at 1 rad/s and 15000 Pa at 0.01 rad/s and a viscosity coefficient of 3200 Pa at 1 rad/s and 400 Pa at 0.01 rad/s.

Example 8

A clear polymer gel was obtained by following the same procedure as in Example 6 except for using N-butoxymethyl acrylamide as an acrylic monomer having an alkoxyalkyl group.

The appearance, the tensile strength and the vertical adhesive force of the obtained gel were measured, and the results of measurement are shown in Table 1.

Example 9

A clear polymer gel was obtained by following the same procedure as in Example 6 except for using N-methoxymethyl acrylamide as an acrylic monomer having an alkoxyalkyl group and using polyoxypropylene diglyceryl ether (polyoxypropylene molecular weight 400, trade name: SCP-400, produced by Sakamoto Yakuhin Kogyo Co., Ltd.) as a polyhydric alcohol.

The appearance, the tensile strength and the vertical adhesive force of the obtained gel were measured, and the results of measurement are shown in Table 1.

Example 10

A clear polymer gel was obtained by following the same procedure as in Example 6 except for using polyoxypropylene diglyceryl ether (polyoxypropylene molecular weight 1200, trade name: SCP-1200, produced by Sakamolo Yakuhin Kogyo Co., Ltd.) as a polyhydric alcohol.

The appearance, the tensile strength and the vertical adhesive force of the obtained gel were measured, and the results of measurement are shown in Table 1.

Example 11

A clear polymer gel was obtained by following the same procedure as in Example 6 except for using polyoxypropylene diglyceryl ether (polyoxypropylene molecular weight 1600, trade name: SCP-1600, produced by Sakamoto Yakuhin Kogyo Co., Ltd.) as a polyhydric alcohol.

The appearance, the tensile strength and the vertical adhesive force of the obtained gel were measured, and the results of measurement are shown in Table 1.

Example 12

A clear polymer gel was obtained by following the same procedure as in Example 11 except for changing a thickness of the gel to 0.3 mm.

The appearance, the tensile strength and the vertical adhesive force of the obtained gel were measured, and the results of measurement are shown in Table 1.

Example 13

In 100 parts by weight of isobutoxymethyl acrylamide as an acrylic monomer having an alkoxyalkyl group, 1.7 parts by weight of potassium hexafluorophosphate (produced by STELLA CHEMIFA Corp.) as an electrolyte and 5.8 parts by weight of propylene carbonate (produced by Showa Denko K.K.) as a solvent were mixed, and the resulting mixture was stirred to be completely dissolved to obtain a solution. In the obtained solution, 0.2 parts by weight of 1-[4-(2-hydroxy-ethoxy)-phenyl]-2-hydroxy-2-methyl-propane-1-one as an initiator and 0.15 parts by weight of polyethyleneglycol dimethacrylate (trade name: BLEMMER PDE-400, produced by NOF Corp.) as a crosslinkable monomer were mixed, and the resulting mixture was stirred to be completely dissolved to obtain a solution. A clear polymer gel was obtained by following the same procedure as in Example 1 except for mixing 58.5 parts by weight of polyoxypropylene diglyceryl ether (polyoxypropylene molecular weight 1000, trade name: SCP-1000, produced by Sakamoto Yakuhin Kogyo Co., Ltd.) as a polyhydric alcohol in the obtained solution, and further stirring the resulting mixture to obtain a transparent and colorless monomer-compounded solution.

The appearance, the tensile strength and the vertical adhesive force of the obtained gel were measured, and the results of measurement are shown in Table 1. Further, electric resistance of this gel was measured to obtain an electric resistance value of 85 kΩ.

Example 14

In 100 parts by weight of isobutoxymethyl acrylamide as an acrylic monomer having an alkoxyalkyl group, 8.3 parts by weight of potassium hexafluorophosphate (produced by STELLA CHEMIFA Corp.) as an electrolyte and 29.2 parts by weight of propylene carbonate (produced by Showa Denko K.K.) as a solvent were mixed, and the resulting mixture was stirred to be completely dissolved to obtain a solution. In the obtained solution, 0.2 parts by weight of 1-[4-(2-hydroxyethoxy)-phenyl]-2-hydroxy-2-methyl-propane-1-one as an initiator and 0.15 parts by weight of polyethyleneglycol dimethacrylate (trade name: BLEMMER PDE-400, produced by NOF Corp.) as a crosslinkable monomer were mixed, and the resulting mixture was stirred to be completely dissolved to obtain a solution. A clear polymer gel was obtained by following the same procedure as in Example 1 except for mixing 28.5 parts by weight of polyoxypropylene diglyceryl ether (polyoxypropylene molecular weight 1000, trade name: SCP-1000, produced by Sakamoto Yakuhin Kogyo Co., Ltd.) as a polyhydric alcohol in the obtained solution, and further stirring the resulting mixture to obtain a transparent and colorless monomer-compounded solution.

The appearance, the tensile strength and the vertical adhesive force of the obtained gel were measured, and the results of measurement are shown in Table 1. Further, electric resistance of this gel was measured to obtain an electric resistance value of 30 kΩ.

Example 15

In 100 parts by weight of isobutoxymethyl acrylamide as an acrylic monomer having an alkoxyalkyl group, 8.3 parts by weight of lithium perchlorate (produced by Wako Pure Chemical Industries, Ltd.) as an electrolyte and 29.2 parts by weight of propylene carbonate (produced by Showa Denko K.K.) as a solvent were mixed, and the resulting mixture was stirred to be completely dissolved to obtain a solution. In the obtained solution, 0.2 parts by weight of 1-[4-(2-hydroxy-ethoxy)-phenyl]-2-hydroxy-2-methyl-propane-1-one as an initiator and 0.15 parts by weight of polyethyleneglycol dimethacrylate (trade name: BLEMMER PDE-400, produced by NOF Corp.) as a crosslinkable monomer were mixed, and the resulting mixture was stirred to be completely dissolved to obtain a solution. A clear polymer gel was obtained by following the same procedure as in Example 1 except for mixing 28.5 parts by weight of polyoxypropylene diglyceryl ether (polyoxypropylene molecular weight 1000, trade name: SCP-1000, produced by Sakamoto Yakuhin Kogyo Co., Ltd.) as a polyhydric alcohol in the obtained solution, and further stirring the resulting mixture to obtain a transparent and colorless monomer-compounded solution.

The appearance, the tensile strength and the vertical adhesive force of the obtained gel were measured, and the results of measurement are shown in Table 1. Further, electric resistance of this gel was measured to obtain an electric resistance value of 39 kΩ.

Comparative Example 1

A clear polymer gel was obtained by following the same procedure as in Example 1 except for mixing 0.1 parts by weight of 1-[4-(2-hydroxyethoxy)-phenyl]-2-hydroxy-2-methyl-propane-1-one as an initiator in 100 parts by weight of isobutoxymethyl acrylamide as an acrylic monomer having an alkoxyalkyl group without using a polyhydric alcohol, and further stirring the resulting mixture to obtain a transparent and colorless monomer-compounded solution.

The appearance, the tensile strength and the vertical adhesive force of the obtained polymer were measured, and the results of measurement are shown in Table 1.

Comparative Example 2

A polymer gel was obtained by following the same procedure as in Example 1 except for using 17% by weight of isobutoxymethylacrylamide as a acrylic monomer having an alkoxyalkyl group and 83% by weight of N,N-diethylacrylamide.

The appearance, the tensile strength and the vertical adhesive force of the obtained gel were measured, and the results of measurement are shown in Table 1.

Comparative Example 3

78% by weight of n-butyl acrylate (n-BuAA), 20% by weight of 2-ethylhexyl acrylate (2-EHA), and 2% by weight of acrylic acid were mixed. In 100 parts by weight of this mixed solution, 0.3 parts by weight of 1,9-nonandiol diacrylate (NDA) as a crosslinkable monomer and 0.3 parts by weight of a eutectic mixture (trade name: Irgacure 500, produced by Ciba Specialty Chemicals K.K.) of 1-hydroxy-cyclohexyl-phenyl-ketone and benzophenon as an initiator were mixed, and the resulting mixture was stirred. A polymer gel was obtained by following the same procedure as in Example 1 except for further mixing 24.2 parts by weight of bis(2-ethylhexyl)phthalate as a plasticizer and 2.5 parts by weight of silica powder in 100 parts by weight of the obtained mixed solution, and further stirring the resulting mixture to obtain a transparent and colorless monomer-compounded solution.

The appearance, the tensile strength and the vertical adhesive force of the obtained gel were measured, and the results of measurement are shown in Table 1.

Comparative Example 4

A polymer gel was obtained by following the same procedure as in Example 1 except for using bis(2-ethylhexyl)phthalate as a plasticizer in place of the polyhydric alcohol.

The appearance, the tensile strength and the vertical adhesive force of the obtained gel were measured, and the results of measurement are shown in Table 1.

TABLE 1

| | | appearance of gel | tensile strength (N) | vertical adhesive force (g/φ12) |
|---|---|---|---|---|
| Ex. | 1 | ○ | 4.8 | 1100 |
| | 2 | ○ | 6.1 | 900 |
| | 3 | ○ | 3.2 | 750 |
| | 4 | ○ | 5.1 | 800 |
| | 5 | ○ | 2.5 | 1030 |
| | 6 | ○ | 4.9 | 850 |
| | 7 | ○ | 10.0 | 1000 |
| | 8 | ○ | 4.2 | 750 |
| | 9 | ○ | 3.3 | 800 |
| | 10 | ○ | 5.6 | 1150 |
| | 11 | ○ | 7.0 | 1500 |
| | 12 | ○ | 4.0 | 750 |
| | 13 | ○ | 4.0 | 1050 |
| | 14 | ○ | 2.9 | 910 |
| | 15 | ○ | 3.1 | 950 |
| Com. Ex. | 1 | ○ | — | 0 |
| | 2 | ○ | 0.5 | 1250 |
| | 3 | ○ | 1.6 | 700 |
| | 4 | x | — | — |

In Table 1, a symbol "—" means to be unmeasurable.

The gels of Examples 1 to 15 had good handleability since they were clear and have high tensile strength of 2.5 N or more. Therefore, these gels did riot break in peeling off the gel and are easy-to-peel. Furthermore, as is evident from Example 1 and Examples 13 to 15, it is also possible to reduce the electric resistance of the gel by adding an electrolyte.

On the other hand, the gel of Comparative Example 1 was very hard and lacks the flexibility, and therefore it did not have good handleability. Therefore, the gel became cracked and was split when starting to pull the gel for peeling off it.

In the gels of Comparative Examples 2 and 3, since tensile strength was not sufficient, the gels did not have good handleability. Accordingly, the gels broke at the time of peeling off the gel.

In the gel of Comparative Example 4, the plasticizer or the like bled after polymerization and the surface of the gel became sticky, and therefore the gel could not be used as a gel.

From Examples and Comparative Examples, it is found that by combining a polymer formed from a specific acrylic monomer with a polyhydric alcohol, a gel, which has good appearance and is superior in the tensile strength, the adhesive force and the viscoelasticity, is attained. Since the gels of Examples have these excellent characteristics, they can be peeled off without breaking gel or remaining gel in applications in which it is desired to peel off the gel after sticking it.

In addition, amounts of the raw materials used in Examples and Comparative Examples are summarized in Table 2.

TABLE 2

| | | IBMA | DEAA | PDE | NDA | acrylic acid | 2-EHA | n-BuAA | NMMA | NBMA | SCP400 | SCP1000 | SCP1200 |
|---|---|---|---|---|---|---|---|---|---|---|---|---|---|
| Ex. | 1 | 100 | | | | | | | | | | 66.5 | |
| | 2 | 83 | 17 | | | | | | | | | 66.5 | |
| | 3 | 58 | 42 | | | | | | | | | 66.5 | |
| | 4 | 100 | | | | | | | | | | | |
| | 5 | 100 | | | | | | | | | | 87.5 | |
| | 6 | 100 | | 0.15 | | | | | | | | 66 | |
| | 7 | 100 | | 0.5 | | | | | | | | 66 | |
| | 8 | | | 0.15 | | | | | | | 100 | 66 | |
| | 9 | | | 0.15 | | | | | 100 | | | 66 | |
| | 10 | 100 | | 0.15 | | | | | | | | | 66 |
| | 11 | 100 | | 0.15 | | | | | | | | | |
| | 12 | 100 | | 0.15 | | | | | | | | | |
| | 13 | 100 | | 0.15 | | | | | | | | 58.5 | |
| | 14 | 100 | | 0.15 | | | | | | | | 28.5 | |
| | 15 | 100 | | 0.15 | | | | | | | | 28.5 | |
| Com. Ex. | 1 | 100 | | | | | | | | | | | |
| | 2 | 17 | 83 | | | | | | | | | 66.5 | |
| | 3 | | | | 0.3 | 1.6 | 16 | 61 | | | | | |
| | 4 | 100 | | | | | | | | | | | |

| | | SCP1600 | PPG1000 | PPG2000 | plasticizer | initiator 1 | initiator 2 | silica | PC | electrolyte 1 | electrolyte 2 | total |
|---|---|---|---|---|---|---|---|---|---|---|---|---|
| Ex. | 1 | | | | | 0.2 | | | | | | 166.7 |
| | 2 | | | | | 0.2 | | | | | | 166.7 |
| | 3 | | | | | 0.2 | | | | | | 166.7 |
| | 4 | | 66.5 | | | 0.2 | | | | | | 166.7 |
| | 5 | | | 62.5 | | 0.3 | | | | | | 250.3 |
| | 6 | | | | | 0.2 | | | | | | 166.4 |
| | 7 | | | | | 0.2 | | | | | | 166.7 |
| | 8 | | | | | 0.2 | | | | | | 166.4 |
| | 9 | | | | | 0.2 | | | | | | 166.4 |
| | 10 | | | | | 0.2 | | | | | | 166.4 |
| | 11 | 66 | | | | 0.2 | | | | | | 166.4 |
| | 12 | 66 | | | | 0.2 | | | | | | 166.4 |
| | 13 | | | | | 0.2 | | | 5.8 | 1.7 | | 166.4 |
| | 14 | | | | | 0.2 | | | 29.2 | 8.3 | | 166.4 |
| | 15 | | | | | 0.2 | | | 29.2 | | 8.3 | 166.4 |
| Com. Ex. | 1 | | | | | 0.1 | | | | | | 100.1 |
| | 2 | | | | | 0.2 | | | | | | 166.7 |
| | 3 | | | | 24.2 | | 0.3 | 2.5 | | | | 105.9 |
| | 4 | | | | 66.5 | 0.2 | | | | | | 166.7 |

In Table 2, IBMA represents isobutoxymethyl acrylamide, DEAA represents N,N-diethylacrylamide, PDE polyethyleneglycol dimethacrylate, NDA 1,9-nonandiol diacrylate, 2-EHA 2-ethylhexyl acrylate, n-BuAA n-butyl acrylate, NMMA N-methoxymethyl acrylamide, NBMA N-butoxymethyl acrylamide, SCP polyoxypropylene diglyceryl ether, PPG polypropylene glycol, the plasticizer bis(2-ethylhexyl)phthalate, the initiator No. 1 Irgacure 2959, the initiator No. 2 Irgacure 500, PC propylene carbonate, the electrolyte No. 1 potassium hexafluorophosphate, and the electrolyte No. 2 lithium perchlorate.

Example 16

By use of the gel of Example 11, the ability of the gel to be re-peeled was checked in the following manner.

A gel cut into a size of 40 mm square was fixed to a base of a tester for measuring the peel strength with a double-faced tape produced by Nichiban Co., Ltd. in Japan, and a vertical adhesive force was measured by following the same procedure as described above. Thereafter, a jig was lowered again and pressed against the gel until a load of 30 g was applied to the gel. Next, the vertical adhesive force was measured by following the same procedure as described above. Furthermore, the same operation was repeated once more to measure the vertical adhesive force in the same manner. The vertical adhesive force was 1500 g at the first measurement, 1420 g at the second measurement, and 1480 g at the third measurement, and it was found that the vertical adhesive force changes little.

Example 17

A production method of a roll-like adhesive tape, in which a roll to roll apparatus is used, will be described by use of FIG. 1.

The monomer-compounded solution 7 used in Example 1 was added dropwise onto a PET film 1 coated with silicone, which was sent out from a material film roll. A PET film 2 coated with silicone, which was sent out from a material film roll, was overlaid on the face on which the monomer-compounded solution was added dropwise.

Next, the monomer-compounded solution was passed through between two rolls 3 to be pressed and spread so as to be 0.5 mm in thickness. Thereafter, by irradiating ultraviolet rays having an energy amount of 3000 mJ/cm$^2$ to the solution with a metal halide lamp 4, a sheet-like adhesive tape was obtained.

The PET film 2 of the obtained adhesive tape was peeled off and wound around a roll. Next, a polyethylene film 5 coated with silicone, which was sent out from a material film roll, was stuck on the adhesive tape in place of the PET film 2.

Thereafter, a roll-like adhesive tape 6 was obtained by winding the resulting sheet-like adhesive tape in such a way that the polyethylene film 5 faces outward.

A schematic view of the obtained roll-like adhesive tape 6 is shown in FIG. 2. Reference numeral 8 in the drawing represents a gel.

What is claimed is:

1. A high-strength adhesive polymer gel consisting of a polymer, a polyoxyalkylene ether addition product of (poly) glycerin, and an additive as an optional component, wherein:
    the polymer is
        a monopolymer of an alkoxyalkyl acrylamide with 2 to 10 carbon atoms in the alkoxyalkyl group selected from the group consisting of isobutoxymethyl acrylamide, N-methoxymethyl acrylamide, and Nbutoxymethyl acrylamide, or
        a copolymer copolymerized from
            1) an alkoxyalkyl acrylamide with 2 to 10 carbon atoms in the alkoxyalkyl group selected from the group consisting isobutoxymethyl acrylamide, N-methoxymethyl acrylamide, N-butoxymethyl acrylamide and combinations thereof, and
            2) an acrylic monomer copolymerized with the alkoxyalkyl acrylamide with 2 to 10 carbon atoms in the alkoxy group selected from the group consisting of N,N-diethylacrylamide and polyethyleneglycol dimethacrylate, wherein the alkoxyalkyl acrylamide with 2 to 10 carbon atoms in the alkoxy alkoxyalkyl group makes up 50% by weight or more of a total amount of polymerizable monomer,
    and the gel has a vertical adhesive force of 500 g/Φ12 or more and tensile strength of 2N or more,
    wherein
    the additive is selected from the group consisting of an electrolyte, an organic solvent, water, an antiseptic agent, a disinfectant, a fungicide, a rust preventive agent, an antioxidant, a stabilizer, a pH adjuster, a fragrant material, a surfactant, a coloring agent, an anti-inflammatory medication, a vitamin preparation, and a whitening agent, and
    wherein the organic solvent is selected from the group consisting of acetonitrile, dimethyl carbonate, ethylene carbonate, propylene carbonate, and butylene carbonate.

2. The high-strength adhesive polymer gel of claim 1, wherein the polyoxyalkylene ether addition product of (poly) glycerin is contained in the range of 40 to 200 parts by weight with respect to 100 parts by weight of the polymer.

3. The high-strength adhesive polymer gel of claim 1, wherein the polyether addition product of (poly)glycerin is polyoxyethylene glyceryl ether, polyoxyethylene diglyceryl ether, polyoxyethylene polyoxypropylene glyceryl ether, polyoxyethylene polyoxypropylene diglyceryl ether, polyoxypropylene glyceryl ether, or polyoxypropylene diglyceryl ether.

4. The high-strength adhesive polymer gel of claim 1 comprising an electrolyte in an amount 0.5% by weight or more.

5. An adhesive tape comprising a supporter, a layer of a high-strength adhesive polymer gel which is coated on at least one surface of the supporter, and a separator film covering the layer of the high-strength adhesive polymer gel, wherein the high-strength adhesive polymer gel consists of a polymer, a polyoxyalkylene ether addition product of (poly)glycerin, and an additive as an optional component wherein:
    the polymer is
        a monopolymer of an alkoxyalkyl acrylamide with 2 to 10 carbon atoms in the alkoxyalkyl group selected from the group consisting of isobutoxymethyl acrylamide, N-methoxymethyl acrylamide, and N-butoxymethyl acrylamide, or
        a copolymer copolymerized from
            1) an alkoxyalkyl acrylamide with 2 to 10 carbon atoms in the alkoxyalkyl group selected from the group consisting isobutoxymethyl acrylamide, N-methoxymethyl acrylamide, N-butoxymethyl acrylamide, and combinations thereof, and
            2) an acrylic monomer selected from the group consisting of N,N-diethylacrylamide and polyethyleneglycol dimethacrylate, wherein the alkoxyalkyl acrylamide with 2 to 10 carbon atoms in the alkoxyalkyl group makes up 50% by weight or more of the total amount of polymerizable monomer,
    and the gel has a vertical adhesive force of 500 g/Φ12 or more and tensile strength of 2N or more,
    wherein
    the additive is selected from the group consisting of an electrolyte, an organic solvent, water, an antiseptic agent, a disinfectant, a fungicide, a rust preventive agent, an antioxidant, a stabilizer, a pH adjuster, a fragrant material, a surfactant, a coloring agent, an anti-inflammatory medication, a vitamin preparation, and a whitening agent, and wherein the organic solvent is selected from the group consisting of acetonitrile, dimethyl carbonate, ethylene carbonate, propylene carbonate, and butylene carbonate.

6. The adhesive tape of claim 5, wherein the adhesive tape is wound in a shape of roll.

\* \* \* \* \*